Dec. 7, 1965   R. A. ENGELHARDT   3,222,535
SYSTEM FOR DETECTION OF UTILIZATION OF MAXIMUM AVAILABLE POWER
Filed Nov. 10, 1961   2 Sheets-Sheet 1

INVENTOR.
RICHARD A. ENGELHARDT
BY
*Sughrue, Rothwell, Mion & Zinn*
ATTORNEYS

INVENTOR.
RICHARD A. ENGELHARDT
BY
ATTORNEYS

United States Patent Office 3,222,535
Patented Dec. 7, 1965

3,222,535
SYSTEM FOR DETECTION OF UTILIZATION OF MAXIMUM AVAILABLE POWER
Richard A. Engelhardt, Baltimore, Md., assignor to Martin-Marietta Corporation, Baltimore, Md., a corporation of Maryland
Filed Nov. 10, 1961, Ser. No. 151,532
12 Claims. (Cl. 307—66)

This invention relates to apparatus for indicating the utilization of maximum available power from a source by a given load, and more particularly to the use of such apparatus in a system employing a solar-cell intermittently as a primary source of power along with a secondary source wherein the maximum available power output of the solar-cell is used to recharge the secondary source during the period when the solar-cell is delivering power to the load.

One of the primary requirements of a highly efficient power system for use in an environment of limited area is in the sizing and efficient utilization of the devices employed therein. One such type of power system employs a solar-cell or cells which advantageously convert the power of the sun to electrical energy required to operate electrical equipment. The solar-cell delivers power during the light cycle, but since the load equipment will require power during the dark cycle, an auxiliary or secondary source of power must be incorporated in the system. Where the system operates with direct current, a conventional battery is conveniently utilized as the secondary source. The system is normally arranged such that the battery stores excess power from the solar-cell during the light period for use during the dark period. In charging the secondary battery, the power absorbed by the battery is a function of the voltage supplied by the solar-cell as well as its own state of charge. At any instant, therefore, the battery presents itself as a fixed load which, in combination with the remaining system loads, may not be optimum for maximum power generation. That is, for a given set of operating conditions, the power delivered by the solar-cell to the combined load of the battery being charged as well as the remaining system loads may be less than the maximum available power output by the solar-cell. It must be remembered that the power that can be delivered by a solar-cell is determined not only by its own characteristics but also by the load impedance and that there is one and only one optimum load which results in maximum power delivery by the cells for a given set of environmental conditions. This load and maximum power are not constants since, for example, an increase in the intensity of the incident sunlight results in an increase in the available amount of maximum power. Therefore, if it were possible to determine whether operating conditions are such that maximum available power output of the solar-cell is not being utilized, then various steps could be taken to increase its power output such as by causing the battery to store more energy, until it resulted in maximum use of power being delivered by the solar cells.

It is therefore a primary object of this invention to provide means for detecting whether the maximum available power of any power source is being utilized even though the magnitude of maximum power may not be the same under all conditions.

In addition to the problem of determining whether the maximum available power is being delivered by the source of power to a given load, there is the additional requirement of finding means effectively to utilize and to store this maximum available power so as to use the system at its maximum efficiency. If the circuit loads are considered as one fixed resistive load and the battery as the other load, the total load current can be increased merely by increasing the charging current to the battery. The charging rate is determined by the potential applied to the battery during charging time, and it is readily apparent that the charging current could be increased by increasing the potential. Inclusion of means for increasing this potential would result in an increase in load current which could be increased to the point at which the solar-cell is operating at maximum efficiency and delivering the maximum available power to the combined load.

It is, therefore, another object of this invention to provide an improved power system including a solar-cell or primary source for delivering power to a load and for charging a secondary source wherein means are provided for increasing the charging current from the solar-cell to the secondary source for the utilization of the maximum available power output of the solar-cell.

Due to variations in intensity of illumination of the solar cell, the power output of this source will vary considerably. The solution to the general problem lies in the ability to force the battery to accept a greater (or lesser) charge when the illumination on the solar cell increases (or decreases) making more (or less) power available. For a fixed level of illumination, if the circuit conditions change such that more power is available for charging, the terminal voltage at the higher power point is less than that at the lower power point and is therefore contrary to conditions which must exist to force the battery to absorb the greater power. In relating the potential of the solar-cell to the potential of the battery, the conventional approach is to add a sufficient number of solar-cells in series such that their combined potential is substantially higher than the open circuit, no load potential of the battery. Thus, the solar-cell will always have sufficient potential to supply a charging current to the battery. While the solution to this problem lies in providing means for raising the voltage at the battery, conventional voltage boosters connected directly across the battery do not operate with the efficiency desired.

It is, therefore, another primary object of this invention to provide an improved power system in which the voltage booster means supply only a portion of the power to the battery with the major portion of the power being supplied directly from the solar cell and in which the overall efficiency of the charging circuit is greatly increased.

It is a further object of this invention to provide an improved power system including a solar-cell as a primary source of power for a relatively fixed load and for charging a secondary source wherein the maximum available power output of the solar-cell is constantly utilized and the voltage across the fixed load remains essentially constant.

It is a further object of this invention to provide a power system including a solar-cell as a primary source of power and for charging a secondary source of power whereby these elements operate with maximum efficiency.

It is a further object of this invention to provide an economical light-weight power system of this type.

Other objects of this invention will be pointed out in the following detailed description and claims and illustrated in the accompanying drawings which disclose, by way of example, the principles of this invention and one mode which has been contemplated of applying those principles.

In general, the system of this invention provides means for indicating the utilization of maximum available power from a power source connected to a load including means for providing an incremental change in load and means for measuring the power output of the source. An indicator sensitive to power change is provided to establish indications of "no change" or "power change" whereby a "no change" power indication for any incremental change in load is indicative of maximum power utilization of the source by the load. In one embodiment of this invention, the source of available power comprises a solar-cell which forms a primary power source for the system and acts in conjunction with a secondary source such as a battery connected in parallel therewith to supply a load. Means connected to the indicator are provided for varying the output voltage of a D.C. to D.C. voltage boosting converter to allow a portion of the solar-cell output power to charge the battery. This voltage is added in series to the terminal voltage of the solar-cell to vary the charge rate and automatic maximum power utilization of the solar-cell is thereby achieved. Further means are provided for allowing the battery to apply power to the load by bypassing the voltage booster during the period that the primary power source is inoperative, either when the solar-cell is not exposed to a light source, or when the power outputs are inadequate to carry the load.

Figure 1:
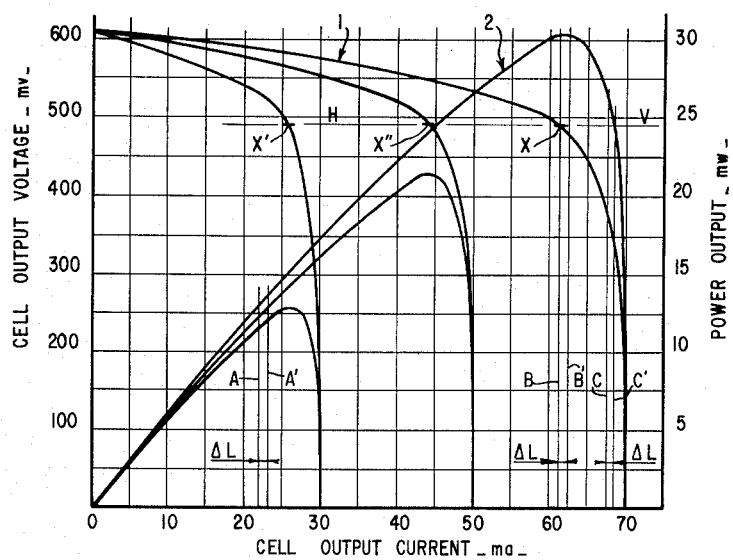
FIGURE 1 is a diagram of the typical voltage-current and power output characteristics of a solar-cell for the system of this invention.

Referring to the drawings, FIGURE 1 shows at 1 a typical voltage-current characteristic curve of a solar-cell for any current load and the curve indicated at 2 represents the power output of the solar-cell for any current load. These curves are typical for a solar-cell, but they can be considered as applicable to any power source since the maximum amount of power is delivered at the time when the load impedance is equal to the power source's internal impedance. The system is shown as operating at three loads indicated at A, B and C, respectively. If, for instance, the system is operating with a load indicated by line A and a small incremental increase in load (ΔL) is added to the system, the operating point will move to the point indicated by vertical A'. Referring to the curve 2 or the power curve, there will be an increase in power output of the cell as a consequence of the incremental increase in load. This increase in power for incremental increase in load indicates that the load is less than that required to cause the maximum available power of the solar-cell to be utilized by the system.

However, if the second case is considered where the system is operating at a load indicated by line B and an incremental change or increase in load (ΔL) is provided whereby the operating point moves to line B', for the small incremental change in load, there is essentially no change, either increase or decrease, in power. At this point, the system is operating near the flat portion of the power curve 2 and the absence of a change in the power output for a change in load is an indication that the system is operating at the point where the solar-cell is delivering the maximum available power and the system is being utilized at its greatest efficiency.

If the system is being operated at the point indicated by line C, an incremental change in load ΔL would move the system operating point to the point indicated by line C', and result in a decrease in the power being supplied by the solar-cell indicating that the load demand on the solar-cell is excessive.

Figure 2:
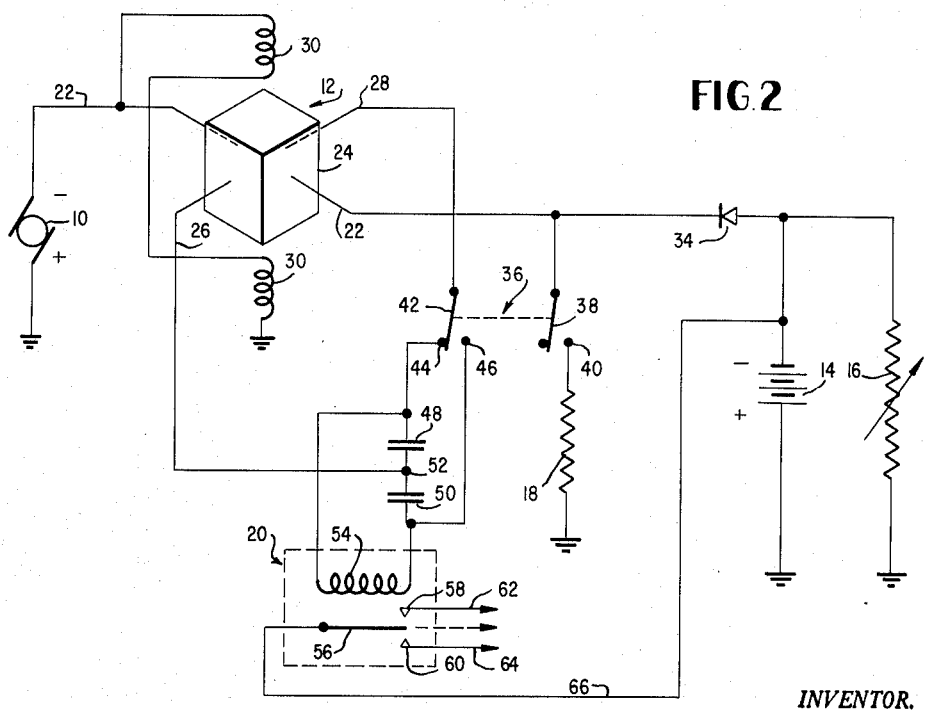
FIGURE 2 is a schematic drawing of the system for indicating the utilization of maximum available power output from a source of power.

The present invention is directed to means therefor for determining if the actual loading of the solar-cell or other power source is (1) less than; (2) equal to; or (3) greater than that which is required for maximum solar-cell output power. One method of providing a determination of whether the system is operating under conditions of 1, 2 or 3, is shown in the circuit of FIGURE 2. The important elements which are employed in this circuit are shown as their most elementary equivalents for the sake of clarity. Basically, the system comprises a source of power 10 which for this purpose is considered to be a solar-cell, a power sensor 12, a secondary source of power or battery 14, the system load indicated at 16 as consisting of a variable resistor, a dummy load 18 which may be switched into the system and a detector 20.

The solar-cell 10 which forms the primary source of power is connected on one side to ground and on the other side through lead 22 to a solid state device 24 employing the Hall effect. The Hall effect device 24 is connected in series with the system load 16 so that any current passing to the system load 16, the battery 14 or the dummy load 18 passes through the Hall effect device. The signal, which is a D.C. potential generated across the Hall effect device output leads 26 and 28, is proportional to the product of the current passing through device 24 and the magnetic field intensity set up in coils 30, which are connected across the source 10. The flux set up by coils 30 is proportional to the voltage output of the solar-cell 10. Since the product of voltage and current is power, the output of the Hall effect device 24 is a measure of the power output of the solar-cell source 10. As indicated previously, a current passing through the Hall effect device 24 is utilized both for operating the normal system load resistance at 16 and for charging the battery 14 connected in parallel therewith. A conventional diode 34 is provided in series between the solar-cell 10 and the battery 14 for preventing reverse flow of battery current to the power sensor and the solar-cell during periods when the battery potential is greater than that of the solar-cell. A double-pole, double-throw switch indicated generally at 36 is provided with one movable contact 38 and a stationary contact 40 for connecting the dummy load 18 across the solar-cell 10 in parallel with the remaining system load. While the switch 36 is shown as being a mechanical switch, it can take any form such as a conventional electronic flip-flop for alternately inserting and removing the small dummy load 18. Synchronized with movable switch contact member 38 is a second pole including movable contact member 42 which is connected to the Hall effect device output lead 28 and alternately makes contact with stationary contacts 44 and 46. A pair of condensers 48 and 50 are connected in series with each other and by means of center tap 52 connected to the other output lead 26 of the Hall effect device, thereby allowing the capacitors 48 and 50 to be alternately charged by placement across the output of the power sensor 12. The capacitors are so connected that the voltage across the two in series is the algebraic difference between the power sensor's output under the two different loading conditions, that is, the condition wherein the dummy load 18 is incorporated in the load circuit and the condition wherein the dummy load is excluded. In the system shown, a coil 54 of a polarized relay is connected across both capacitors 48 and 50 so that the current flow through the coil will be in one direction or the other, or nil, depending upon the cumulative effect of the charges of each of the capacitors 48 and 50. The polarized voltage sensor 20 includes a movable contact member or armature 56 which normally occupies a neutral or central position between a pair of stationary contacts 58 and 60. These contacts are connected to output lines 62 and 64, respectively, which may, for instance, be connected to appropriate indicators (not shown) to indicate the presence or absence of current passing through these leads via line 66 connected to the movable armature 56. In the system shown, as the movable contact members 38 and 42 of switch 36 oscillate, the two capacitors 48 and 50 receive a charge dependent upon the effect on the power output of the solar-cell as the dummy load is switched into and out of the circuit. If the assumption is made that the system is operating at the point indicated in line A of FIGURE 1, and an incremental increase in load is achieved by switching the dummy load 18 across the solar-cell by closure of switch contacts 38 and 40, there will be a greater charge on condenser 50 than on condenser 48 which will result in closure of polarized relay contacts 56 and 60. Output lead 64 is energized to indicate operation on this portion of the curve and, as such, that the solar-cell is not delivering the maximum power output available. However, assuming the system is operating at the point indicated by line B, FIGURE 1, both capacitors 48 and 50 will be charged equally and there will be no current flow through relay coil 54 and as a result the armature 56 will remain in a neutral position with no current flow to either output leads 62 or 64, thus indicating that maximum available power is being used. However, if the system is operating at the point indicated by C, FIGURE 1, movement of switch member 36 to position where contacts 38 and 40 are closed would result in a smaller charge appearing on capacitor 50 with respect to capacitor 48, and as a result, the current flow through relay coil 54 would be reversed with the result that armature 56 now moves to contact 58, energizing output line 62 to indicate that the solar-cell is over-loaded and, as a matter of fact, that the power output of the solar-cell has decreased by the incremental increase in load. It is readily apparent that various devices could be incorporated in this circuit to indicate just how far from the optimum point on the curve the system is operating to facilitate the taking of appropriate steps for correcting this condition. The system shown in FIGURE 2 is only one method of achieving the desired indication of whether or not the maximum available power output of the solar-cell is being utilized by the system. Various changes and modifications are envisioned by the inventor without departing from the scope of the present invention.

In addition to the determination of whether or not the system is operating such that the source is delivering the maximum available power to the system, it is equally important to provide means for advantageously insuring that the system is operating continuously at the point where the maximum power available from the source is being utilized. As mentioned previously, one important use of power in excess of that required for operation of the components of a system subjected periodically to the power of the sun is the utilization of the excess power for recharging the battery or other secondary source of power. Automatic means for accomplishing this purpose are incorporated in the system shown in FIGURE 3. Although the system shown in FIGURE 3 makes use of all the elements shown in the basic circuitry of FIGURE 2, the components making up the power sensor and portions of the polarized voltage sensor are not included. However, all components common to both circuits are given like numerical designations and operate in the identical manner. The output current from the solar-cell is a result of two loads, the current to the resistive system load indicated at 16, and the charging current to the battery 14. Since the charging current to the battery is dependent solely upon the voltage across the battery and the state of charge of the battery, the current can be increased by increasing the potential applied across the battery.

The present invention advantageously makes use of a system in which the solar-cell terminal potential is not higher and preferably lower than the open circuit no load potential of the battery when the battery is in its fully charged condition. However, in order to insure the maximum available power from the solar-cell is being utilized by the system both in supplying the load and in charging the battery, it is necessary to step up the potential across the battery to the point where maximum available power from the cell is being utilized. The present system makes use of a variable voltage booster which may take the form of a D.C. to D.C. converter whose output is connected in series with the solar-cell bus to raise the voltage at the battery. In such a system the greater portion of the power absorbed by the battery is obtained directly from the solar-cell bus with the booster contributing only that portion of the total power being accepted by the battery which is caused by the raise in battery terminal voltage above that of the solar-cell bus. In this manner, although the efficiency of the variable voltage booster may be only 80%, if it is only supplying 10% of the power being absorbed by the battery, the overall efficiency of the system is in the order of 98%, not 80%. At the same time, the actual system load other than that of the battery is connected directly to the solar-cell bus and this voltage is not affected by the increase charging voltage at the battery.

The D.C. to D.C. voltage booster comprises generally a solid state converter 68. The voltage booster makes use of a pair of transistors 94 and 96 which operate in a conventional manner to convert the direct current input from line 22 through line 98 to a periodically varying current in primary 72 of transformer 70. The transistors 94 and 96 each conduct alternately to generate an A.C. potential in the transformer secondary 74 which is applied to the rectifying means 92 to convert it back to D.C., thereby to provide the higher charging potential for battery 14. The rectifier 92 is connected in series between solar-cell bus 22 and battery 14 so that its potential is added to that of the solar-cell. The transformer 74 has a plurality of tap leads 76, 78, 80, 82, 84, 86, and 88. A movable contact arm 90 is provided in conjunction with these tap leads to vary the potential across rectifier 92. In order automatically to vary the position of movable contact member 90 with respect to the taps 76–88, means including motor 100 are provided for reversibly driving the movable contact arm 90 in response to change in the output power of the solar-cell. For this purpose, the system makes use of the relay coil 54 which is coupled directly to the power sensor, not shown in FIGURE 3, and is subjected to a current flow depending upon the condition or charge of the series connected capacitors 48 and 50 shown in FIGURE 2. As indicated previously, the current flow through the relay coil 54 may be zero or of some varying magnitude in either direction. Relay contact arm 56 is movable from its normal deenergized position as shown to either of the two dotted line positions to cause a circuit to be completed from ground through the movable contact 56 to either stationary contact 58 or 60, thus allowing current to flow to the field coils 102 and 104 of motor 100, respectively, depending upon the particular charges occurring across capacitors 48 and 50. The armature 106 of motor 100 will rotate in one direction or the other depending on which of the field coils is energized, the drive current being provided, of course, through line 108 from battery 14.

As the movable tap contact 90 moves in one direction or the other, a corresponding change will take place in the battery charging current and, hence, in the load on the solar-cell. This will tend to reduce the signal from the sensor until a null value is reached. At this point motor armature 106 ceases to rotate and the tap setting on transformer secondary 74 stabilizes at a position ensuring maximum utilization of the power produced by the solar-cell source.

To connect the load 16 to the secondary source 14 when the output of the solar-cell is not sufficient to drive the load, transistor regulating means are provided. Control transistor 109 is provided to sense the voltage on bus 22 and to turn on the series regulating transistor 110 when current from the auxiliary source 14 is required.

Figure 3:
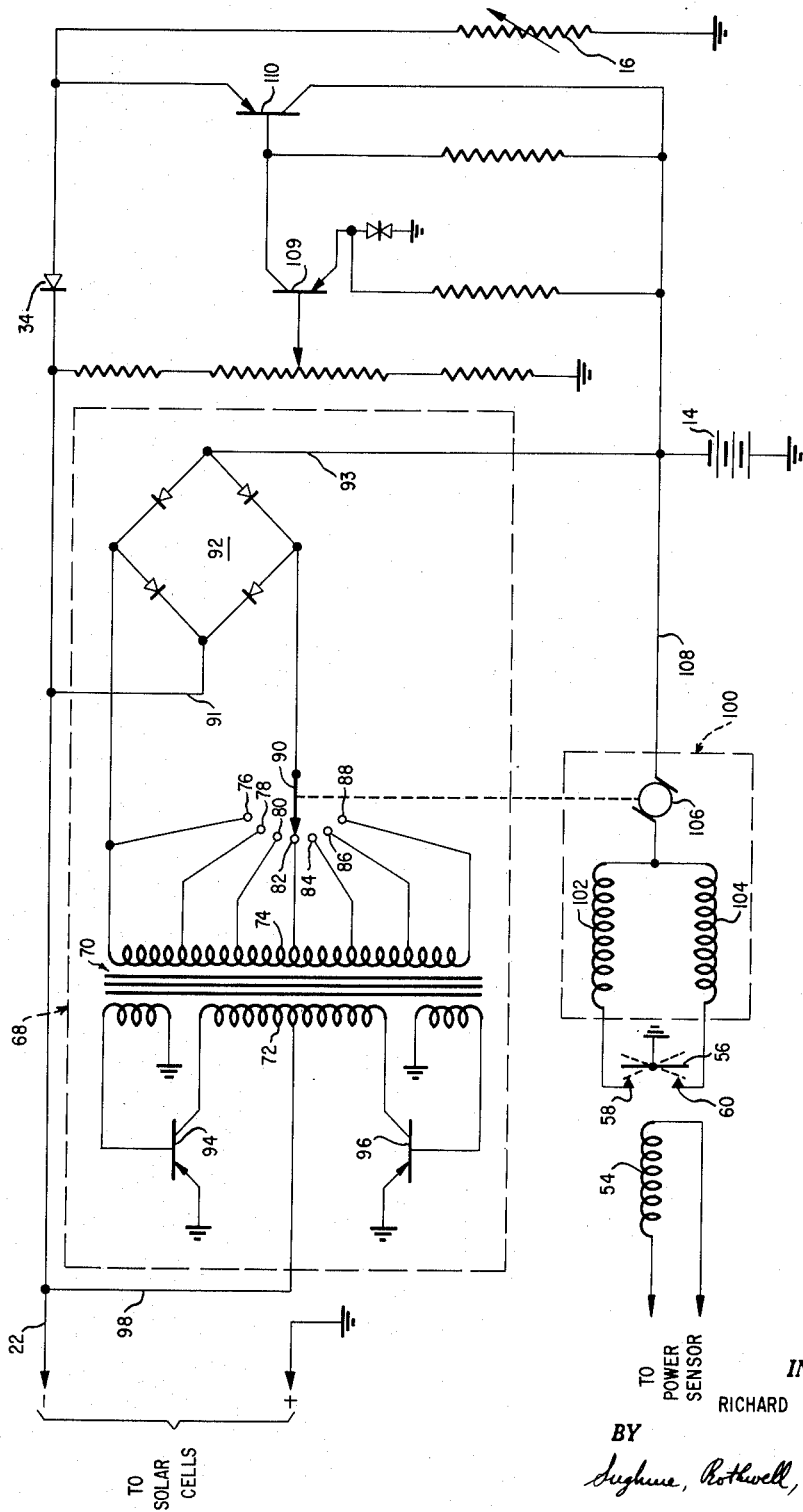
FIGURE 3 is a schematic drawing of a power system employing the present invention including voltage booster and voltage booster bypass circuitry.

The operation of the system shown in FIGURE 3 is as follows. Assuming the system is operating at a point indicated by line A in FIGURE 1, oscillation of switch 36 (FIGURE 2) will result in an unequal charge on capacitors 48 and 50 such that a current flow will be provided in relay coil 54, tending to close switch contacts 56 and 58 energizing the motor series field coil 102 and armature 106 which will result in a counterclockwise rotation of the movable transformer arm 90 from stationary tap 82 towards stationary tap 84 or stationary tap 86, causing the voltage across the rectifier bridge 92 and inherently across the battery 14 to rise, thereby increasing the battery charge current. This, of course, will cause the system to operate closer to the point indicated by line B, whereupon the current flow through coil 54 ceases, the movable contact 56 of the polarized relay will move to the neutral position indicated in FIGURE 3, deenergizing motor field coil 102 and armature 106 with the result that the movable tap arm 90 of the transformer 70 will remain at its new contact position. This may be, for instance, tap point 86 to effectively provide a high current flow to the battery 14 for maximum utilization of the available power from the solar-cell. Should the general system load as indicated by the resistance 16 increase to the point where the operation occurs somewhere in the vicinity of the line indicated at C in FIGURE 1, relay coil 54 will be energized by current flowing in the opposite direction to close contacts 56 and 60 of the relay, energizing field coil 104 and armature 106 tending to reverse the direction of rotation of the armature 106 and moving the tap back to an intermediate tap point such as 82, thereby decreasing the voltage across the battery 14 and reducing the charging current thereto. In this manner, the apparatus tends to insure ultization of the maximum available power output of the solar-cell.

The terminal voltage of the battery varies considerably depending upon whether the battery is being charged at high or low charge rates, or supplying power to the resistive load at either high or low current output rates. For instance, assuming that a typical battery used in such a system is arbitrarily at 25 volts at the point where the battery is receiving no charge and is not supplying the system load, it has been found that the terminal voltage required to effect a charging rate of 12 amps. of current is approximately 28 volts. Likewise, when the battery is supplying current to the system load, if the battery is supplying a current of 12 amps, the terminal voltage of the battery will be found to be less than 23 volts. This indicates an approximate 25 percent variation in battery terminal voltage between the maximum charge rates and the maximum discharge current rates. Assuming that the system load would require 12 amps of current during the dark cycle or that portion of the operational time in which the solar cell is not illuminated, the voltage across the system load would be then in the order of 23 volts. With the present invention, it is therefore only necessary to provide a solar cell array whose terminal voltage would be 23 volts. Even though the requirement of a terminal voltage of 28 volts exists to effect a maximum charge rate on the battery when the solar cell is operating to supply the system load and to charge the battery, this 5-volt difference is adequately supplied by the voltage booster 70. The voltage booster adds the required voltage in series with that supplied by the solar-cell to provide sufficient potential at the battery terminal to insure maximum power utilization by the system from the solar-cell.

In addition to this advantageous feature, the system of the present invention inherently provides for maximum voltage regulation. Referring to FIGURE 1, it is noted that in addition to the voltage current characteristic curve 1 of the solar cell for a given current load at a certain illumination value, there are provided additional voltage-current characteristic curves 1' and 1" for other illumination levels. For instance, at low level illumination indicated by characteristic curve 1', the point marked X' on the curve indicates the point of maximum power available for this level of illumination intensity. If the illumination intensity level increases, the voltage-current characteristic curve shifts to the right, for example to the point indicated by the curve 1". The point of maximum power for this level of illumination is the point indicated on the curve as X". Likewise, for the voltage-current characteristic curve 1 at a still higher illumination level, the point of maximum power output is indicated by the point X. From the horizontal voltage line H, it is seen that the solar-cell output voltage at the point of maximum power output remains constant regardless of the change in illumination intensity, since this line passes through the points X, X' and X". It is extremely important to note that the present system thereby inherently provides extremely good voltage regulation since the operation of the booster 70 will act to cause the entire system to operate at the points where maximum available power of the solar cell is being utilized and therefore at the point where the voltage of the solar-cell remains constant regardless of change in illumination intensity.

While the embodiment shown in FIGURE 3 makes use of a number of components having moving parts such as the polarized relay, the motor for moving the taps of the variable tap transformer and the tap switching elements themselves, it is envisioned that these moving elements may be replaced by conventional static members, particularly of the solid state type which would advantageously provide a complete system in which no moving parts are required. From the foregoing, it is evident that the present invention provides a solar-cell power system in which the number of solar-cells required for supplying the load and for also charging the secondary source is greatly reduced. At the same time, maximum energy from any given solar-cell array is utilized continuously and that not required for immediate use to supply power to the load is stored in a battery for later use. Voltage regulation is greatly improved, and solar-cell temperature rise, due to "off loading" with resulting performance degradation is minimized. The loss or degradation of any cells will not affect the operation of the system at the optimum load point as would normally occur in which there would be a shift away from this point. In addition to the obvious benefit which is derived by the use of this concept in a system employing a fixed array, the value of the system is even more significant due to the fact that the illumination level and thus the power available is continuously changing under normal solar cell operating conditions. The present invention inherently insures continuous operation at the point at which maximum power utilization of the system is achieved regardless of illumination intensity change.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for detecting utilization of maximum available power from a source comprising: a solar-cell providing a source of power, a load connected across said solar-cell, a Hall effect device including output means, means connecting said Hall effect device in series with said given load and said solar-cell, means for subjecting said Hall effect device to a magnetic field proportional to solar-cell output voltage, a pair of capacitors connected in series, means for selectively connecting each of said capacitors across said output means of said Hall effect device, a polarized relay including a single relay coil connected across said series connected capacitors, said polarized relay further including a movable member normally biased to a neutral position but movable to at least one extreme position as a result of current flow within said relay coil, and means operable when one of said capacitors is connected across said output leads of said Hall effect device for incrementally changing the given load across said solar-cell, whereby said movable member of said polarized relay remains in said neutral position only when maximum power utilization of said solar-cell by said load occurs.

2. A system for detecting utilization of maximum available power from a source by a load comprising: a solar-cell forming said power source, a given load connected across said solar-cell, a Hall effect device connected in series with said solar-cell and said load and providing an output voltage proportional to the power supplied by said solar-cell to said load, a pair of capacitors connected in series and adapted to be alternately charged by said Hall effect device, an incremental load, a double-pole, double-throw switch, means associated with said switch for connecting said incremental load across said solar-cell source and for connecting one of said capacitors across said Hall effect device when said switch is in one position and for connecting said other capacitor across said Hall effect device when in said second position, and a polarized relay connected across both of said capacitors for indicating a difference in charge on said capacitors, whereby a similarity of charge is indicative of maximum power utilization of said solar-cell by said load.

3. A system for the utilization of maximum available power from a power source comprising a first load connected across said source, a second load connected in parallel with said first load, means in series with said second load for varying the voltage across said second load in response to changes in power output of said source, means for measuring the power output of said source, means for providing an incremental change in load, and means responsive to a power change for an incremental change in load for operating said voltage varying means until said power measuring means establishes a condition of substantially "no change" in power for an incremental change in load, whereby maximum power utilization of said load by said source occurs.

4. A system for utilization of maximum available power from a variable source of power to a load comprising means for incrementally varying said load, means sensitive to power change as a result of incremental load change to establish indications of substantially no change or power change, and means responsive to power change for varying the current flow to said load until an indication of substantially no power change occurs for incremental change in load to establish conditions of maximum power utilization of said source by said load.

5. A system for utilization of maximum available power from a solar-cell providing a variable source of power to a given load comprising a Hall effect device connected between said solar-cell and said given load for measuring the power output of said solar-cell, means for incrementally varying said given load, and means responsive to a change in power output of said cell for incremental change in load for varying the current flow to said normally fixed load until a condition of substantially no change in power for incremental change in load occurs whereby maximum utilizaiton of available power of said source occurs.

6. A system for utilization of maximum available power from a solar-cell providing a variable source of power to a load comprising a Hall effect device connected between said solar-cell and said load for measuring the power output of said solar-cell, means for incrementally varying said load, means connected to said Hall effect device and movable from a first position indicative of substantially no change in power output of said solar-cell for incremental change in load to a position indicative of change in power output, and means responsive to movement of said movable means to said second position for varying the voltage across said load, whereby current flow to said load is varied and automatic utilization of the maximum available power output of said solar source is achieved.

7. A system for utilization of maximum available power from a solar-cell providing a variable source of power to a load comprising a variable tap transformer positioned between said solar-cell and said load, means positioned between said solar-cell and said transformer for changing the direct current from said solar-cell to alternating current, said transformer including a plurality of secondary tap positions for providing a variable voltage output to said load, rectifier means positioned between said tapped transformer secondary and load, means for measuring the power output of said solar-cell, means for providing an incremental change in load, and means sensitive to power change for incremental change in load for variably connecting said load across said taps of said transformer secondary until substantially no power change for an incremental change in load occurs, resulting in no tap change of said transformer secondary, whereby maximum power utilization of said source by said load occurs.

8. A system for utilization of maximum available power from a solar-cell providing a variable source of power to a load comprising: a transformer positioned between said source and said load and including a tapped secondary connected to said load for variably connecting said load to said transformer secondary, means positioned between said solar-cell and said transformer for changing the direct current from said transformer to alternating current, means positioned between said transformer secondary and said load for rectifying said alternating current, a Hall effect device connected between said solar-cell and said load for measuring the power output of said cell, a pair of capacitors connected in series and adapted to be selectively connected across the output of said Hall effect device, means operable when one of said capacitors is connected across said output leads of said Hall effect device for incrementally changing the normally fixed load, a polarized relay including a relay coil connected across said condensers, a member movable from a neutral position to at least one extreme position in response to current flow through said relay coil for indicating power change in response to incremental change in load, and means responsive to movement of said movable member to said extreme position for varying the connection between said normally fixed load and said tapped transformer secondary until said movable member of said polarized relay returns to the neutral position indicative of maxium power utilization of said solar-cell by said load.

9. A system for utilization of maximum available power from a solar-cell providing a variable source of power for a load connected across said solar-cell, comprising: voltage booster means connected in series between said load and said solar-cell, means for incrementally varying said load, means for measuring the power output of said cell, and means responsive to power change for incremental load change as indicated by said power measuring means to vary the output voltage of said voltage booster whereby said current flow to said load is varied until substantially no power change occurs for an incremental change in load and maximum power utilization of said source by said load occurs.

10. A system for utlization of maximum available power from a solar-cell with maximum voltage regulation comprising a first load connected across said solar-cell, a second load connected across said solar-cell and in parallel with said first load, a voltage booster connected in series with said second load and said solar-cell, means for incrementally varying said system load, means for measuring the power output of said solar-cell, and means responsive to a change in power output of said solar-cell for incremental change in load for varying the potential of said voltage booster to vary said current flow to said second load until a condition of substantially no change in power for incremental change in load occurs, whereby maximum utilization of available power of said source occurs.

11. A system for detecting utilization of maximum available power from a solar-cell providing a variable source of power for a load, comprising: a Hall effect device; means connecting said Hall effect device in series with said load; means for subjecting said Hall effect device to a magnetic field proportional to said solar-cell voltage; a polarized relay having a coil, and a neutral and two extreme positions; means for alternating said load between two incrementally differing values; a pair of capacitors connected in series with each other, the series combination of said capacitors being connected across said relay coil; means, connected to said means for alternating said load between two different values, for alternately connecting the output of said Hall effect device to each of said capacitors in synchronism with said alternation of said load between said incrementally differing values in such a manner that resulting voltages impressed upon said capacitors are in opposition; whereby the neutral position of said polarized relay indicates maximum power utilization of said cell by said load.

12. A system for detecting maximum utilization of power deliverable from a source to a load comprising: means for measuring the power delivered by said source to said load and providing an output signal having a parameter that is a function of the amount of power delivered to said load; means for alternating said load between two incrementally differing values; first and second parameter value storage means; means, connected to said load alternating means, for alternately connecting said output of said power measuring means to said first and second storage means in synchronism with said alternation of said load between said two values; and sensing means connected to said first and second storage means for sensing and comparing the values of said parameter stored therein, whereby maximum utilization of available source power is indicated by the equality of said parameter values stored in said first and second storage means.

References Cited by the Examiner
UNITED STATES PATENTS 1,929,984  10/1933  Maeda _____ 324—137
2,616,074  10/1952  McCreary.

MILTON O. HIRSHFIELD, *Primary Examiner.*

LLOYD McCOLLUM, *Examiner.*